(No Model.) 2 Sheets—Sheet 1.
B. HOLT.
TRACTION ENGINE AND HARVESTER ATTACHMENT.
No. 573,593. Patented Dec. 22, 1896.
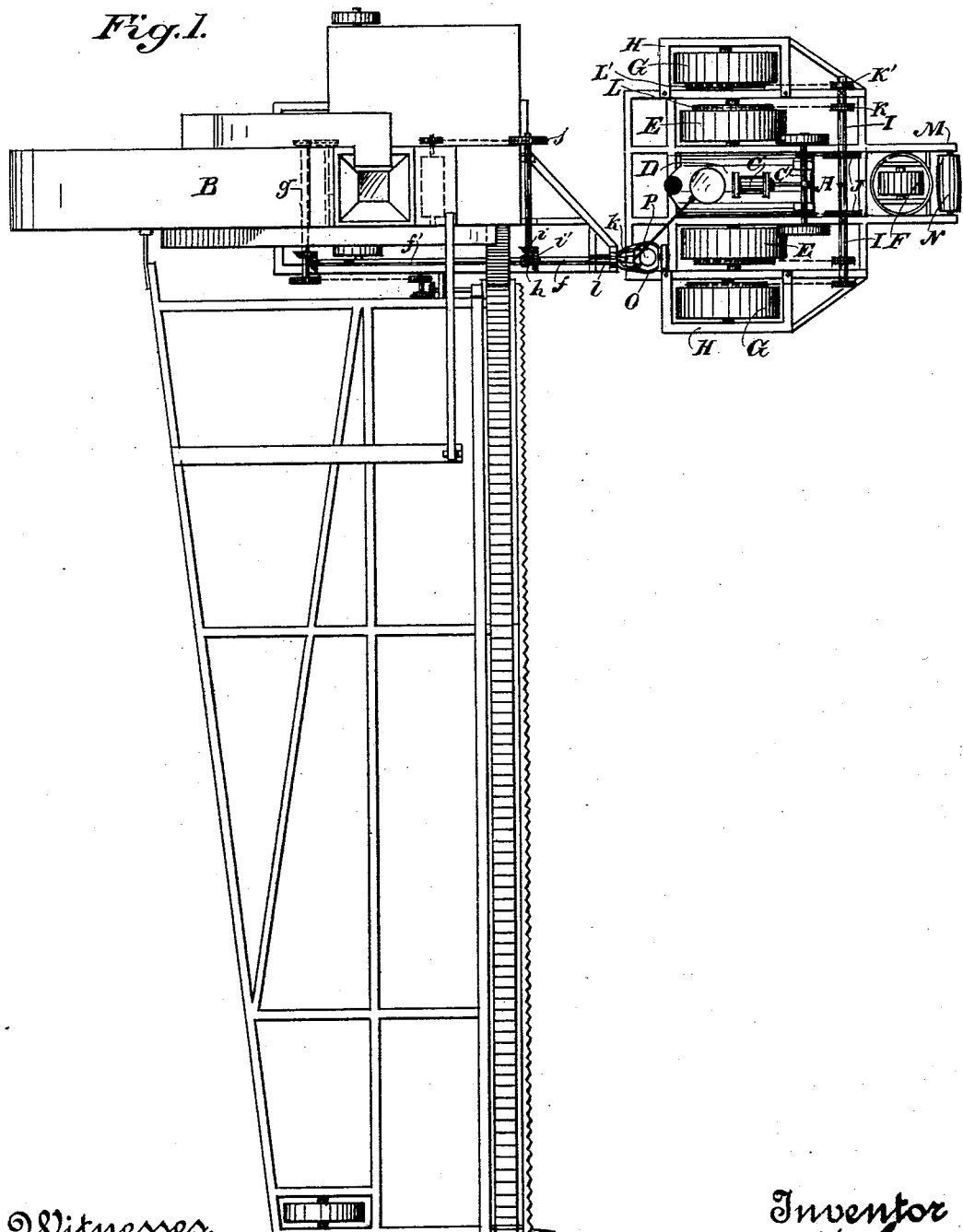

(No Model.) 2 Sheets—Sheet 2.
B. HOLT.
TRACTION ENGINE AND HARVESTER ATTACHMENT.
No. 573,593. Patented Dec. 22, 1896.
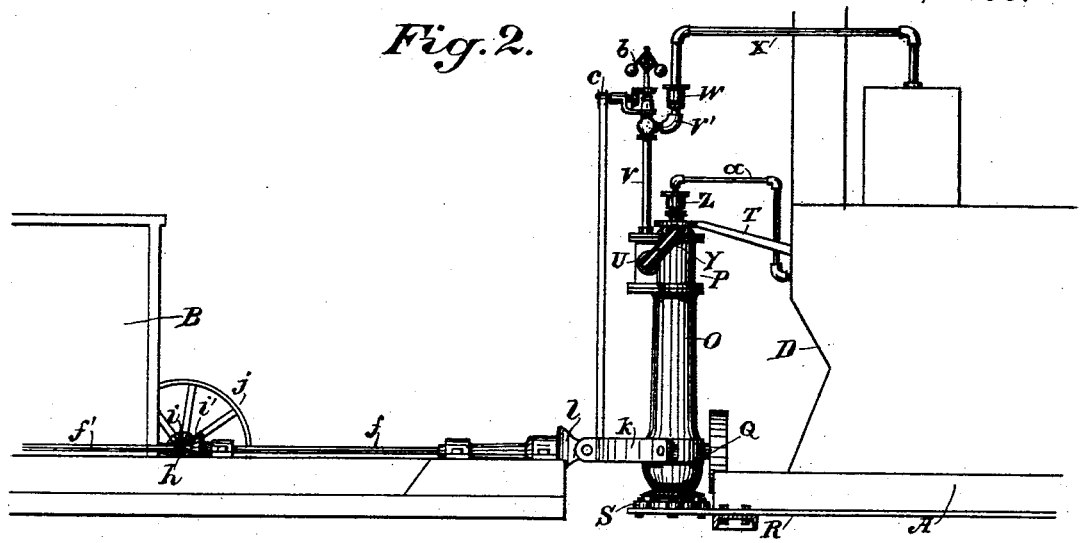
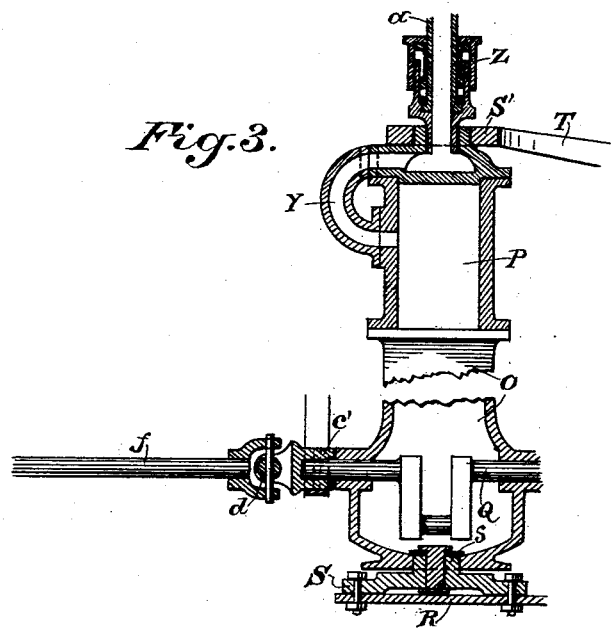
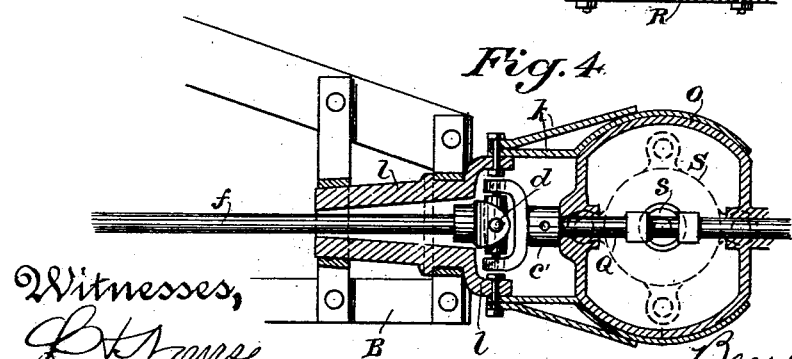
Witnesses,
Inventor,
Benjamin Holt.
By Dewey & Co. Atty.

UNITED STATES PATENT OFFICE.

BENJAMIN HOLT, OF STOCKTON, CALIFORNIA.

TRACTION-ENGINE AND HARVESTER ATTACHMENT.

SPECIFICATION forming part of Letters Patent No. 573,593, dated December 22, 1896.

Application filed July 20, 1896. Serial No. 599,841. (No model.)

*To all whom it may concern:*

Be it known that I, BENJAMIN HOLT, a citizen of the United States, residing at Stockton, San Joaquin county, State of California, have invented an Improvement in Traction-Engine and Harvester Attachments; and I hereby declare the following to be a full, clear, and exact description of the same.

My invention relates to attachments for traction-engines and harvesters; and it consists of certain details of construction, which will be more fully explained by reference to the accompanying drawings, in which—

Figure 1 is a plan view of my traction-engine and harvester. Fig. 2 is a partial side elevation of the supplemental engine and separator. Fig. 3 is a vertical section of the supplemental engine and connections. Fig. 4 is a horizontal section through the lower portion of the same.

The object of my invention is to provide certain improvements in traction-engines and harvesters, and especially in the means for connecting the engine and the harvester with an intermediate supplemental engine by which the harvester mechanism is driven independent of the traction-engine and by which the supplemental engine and the harvester are allowed to turn upon the coupling with relation to the traction-engine without throwing the connecting driving parts out of line.

A is the traction-engine, and B the harvester, of any usual or suitable construction.

In the present case I have shown a horizontal engine C and horizontal boiler D mounted upon a suitable main frame, and having the main bearing-wheels E and the steering-wheel F.

In order to prevent the engine from sinking into soft ground where it occurs, I have shown supplemental wheels G mounted in the supplemental frames H, of any suitable construction, these wheels being slightly in the rear of the main-wheel journals upon independent shafts which are journaled in the supplemental frames. These wheels and their supplemental frames are removably attached to the sides of the main frame exterior to the main wheels, so that when the ground is sufficiently hard for the main wheels to do the work the supplemental wheels, with their frames, can be removed in a few moments and readily attached by bolts and braces, as shown.

I are independently-journaled shafts having sprocket-wheels J fixed upon them, and to these sprocket-wheels chains extend from sprocket-wheels on the engine-shaft C', so that the shafts are rotated thereby.

Upon the shafts I are sprocket-pinions K, from which chains pass around sprocket-wheels L on the main-wheel shaft, and through which power is transmitted to drive the main wheels. Upon the outer ends of the shafts I are other sprocket-wheels K', from which chains pass to the sprocket-wheels L' on the supplemental-wheel shafts, so that power is transmitted directly and independently to each set of wheels when all are attached to the machine, and when the supplemental wheels are removed it is only necessary to remove the chains with them.

In order to support the front end of the engine-frame when running in soft ground, I have shown a portion M of the main frame extending in front of the steering-wheel frame, and having journaled to it a roller N, so placed that under ordinary conditions, when the steering-wheel is sufficient to support the front of the engine, this roller will remain just above the surface of the ground, but will travel upon the ground whenever the steering-wheel begins to sink into it. The whole engine and its frame are thus supported by the supplemental wheels whenever necessary, and the engine is thus capable of working over soft ground, where it would otherwise be entirely useless.

In order to connect the engine with the threshing-machine B, and at the same time provide the necessary power to drive the mechanism of the threshing-machine and harvester, I employ a supplemental engine of any well-known or suitable type.

In the present case I have shown a vertical engine-frame O, having a cylinder P at the upper end and the crank-shaft Q in the lower portion of the frame. This engine-frame is supported upon a plate or bracket R, which is strongly bolted to the engine-frame and projects rearwardly a sufficient distance to receive a socket-plate S, which is bolted to it. This plate has an upwardly-projecting cylindrical portion *s*, which fits into a correspondingly-shaped concavity in the base of the engine-frame, so that the latter may turn freely upon this swivel-plate.

At the top of the engine-frame and cylinder is a second swivel-plate S', turnable in a similar manner upon a pivot at the upper end of the cylinder and in line with the bottom swivel. This upper swivel-plate is connected with the engine boiler or frame by braces T, so that it is held rigidly in place, and while the engine-frame O and cylinder P, with the parts carried thereby, are freely turnable in these swivels, they are strongly held in place, so that the harvester may be drawn by direct connection therewith.

U is the valve-chamber and steam-chest, and V is the steam-pipe connecting therewith. This steam-pipe is connected by an elbow V' with a swivel-joint W, which is directly in line above the swivels S and S' of the engine. From the swivel-joint W connection is made by a pipe X with the steam-dome of the traction-engine boiler, and power is thus applied to drive the supplementary engine.

The exhaust-pipe Y from the steam-chest U leads into the chamber above the top of the cylinder P and thence through a centrally-disposed pipe and a swivel-joint Z, which is in line with the joints S, S', and W.

The exhaust-steam is delivered into a pipe $a$, from which it passes into the smoke-stack or the usual point of exhaust.

The governor $b$ is supported directly above the steam-pipe V, and its driving-pulley $c$ is connected by a belt with a pulley $c'$ upon the crank-shaft Q, the whole being turnable together about the swivel-joints previously described.

The crank-shaft Q has a universal coupling-joint $d$, which connects it with the main driving-shaft $f$, this shaft extending rearwardly and parallel with one side of the threshing-machine, as shown. This swivel-joint serves to transmit the power from the engine-shaft Q to the shaft $f$ and to allow for any irregularities of movement between the engine and the harvester caused by uneven ground.

The engine O P by which the harvester is driven being swiveled upon the vertical line, as previously described, it will be manifest that the traction-engine can be turned to any desired degree to turn corners without in any way affecting the alinement of the engine-shaft Q and the shaft $f$, and when the mechanism of the threshing-machine and header are being driven by the supplementary engine the work can be continued without reference to any turns that may be making at the time.

In order to properly subdivide the power of the shaft $f$, I have shown an extension $f'$ of this shaft which is journaled along the side of the threshing-machine, extending rearwardly to a point where its power is transmitted to a shaft $g$ by means of an intermediate bevel-gear, and from this shaft, by means of the usual belts or driving-chains, the mechanism of the cleaner grain and straw carrier and the header are driven.

A universal joint is introduced at $h$ between the shafts $f$ and $f'$, so as to allow for any irregularities in alinement of so long a shaft. At this point a shaft is journaled transversely of the threshing-machine frame and has fixed upon it a bevel-gear $i$, which engages with a bevel-gear $i'$ upon the shaft $f$. Upon the opposite end of this shaft is a belt-pulley $j$, from which power is transmitted to drive the threshing-cylinder. By this construction I subdivide the power which is transmitted to the shaft $f$, so that by means of the bevel-gears $i$ $i'$ the threshing-cylinder is driven, and through the extension-shaft $f'$ and the connections at the rear the remaining parts of the apparatus are driven.

In order to apply the power of the engine to draw the harvester, I have shown a strong band $k$, which passes partly around the vertical engine-frame O and extends rearwardly upon each side of the driving-shaft Q and the universal-joint coupling $d$, by which connection is made with the shaft $f$. This band $k$ is pivoted to a yoke $l$, which is suitably mounted in bearings or supports on the frame B, said yoke serving as a draw-bar and being fixed against longitudinal movement, and surrounds the shaft $f$ in close proximity with the member of the universal-joint coupling $d$ through which the power of the shaft is transmitted, and the pivotal points between the yoke $l$ and the band $k$ are in line with the corresponding points of the universal joint, so that all parts move freely to accommodate themselves to irregularities. By means of this band and connection I am enabled to apply the full power of the traction-engine through the supplemental-engine frame, and all parts work in unison independent of any turns and movements between the engine and harvester.

Having thus described my invention, what I claim as new, and desire to secure by Letters Patent, is—

1. In combination with a traction-engine and harvester, an independent engine and intermediate connections by which the mechanism of the harvester is driven, said engine being swiveled to the traction-engine so as to form the center about which the engine and harvester are turnable.

2. The combination with a traction-engine and a harvester of an independent vertically-disposed engine, mechanism through which the power of said engine is transmitted to drive the machinery of the harvester, a vertically-disposed swivel-joint connection between the traction-engine and the harvester, about which joint the supplemental engine is turnable to maintain its line with the harvester mechanism.

3. The combination with a traction-engine and harvester of a vertically-disposed supplemental engine, swivel-joints fixed to the traction-engine about which the supplemental engine is turnable, steam and exhaust pipes connecting with said supplemental engine having swivel-joints in line with that about which the engine and harvester are turnable.

4. The combination with a traction-engine and harvester and a swivel-joint about which the two are turnable with relation to each other of a supplemental engine centrally disposed in line with said joint, mechanism connecting said engine with the traction-engine boiler and with the harvester mechanism respectively and swivel-joints about which the supplemental engine is turnable to maintain its connection with the harvester mechanism.

5. The combination with the traction-engine and harvester having a swivel-joint by which they are united and about which they are turnable, of a supplemental engine centrally disposed with relation to the swivel-joint, mechanism connecting said engine-shaft with the mechanism of the harvester whereby the latter is driven from the supplemental engine, a band or universal joint connecting said engine with the harvester whereby the power of the traction-engine is transmitted directly through the supplemental-engine frame to haul the harvester.

6. The combination with a traction-engine and a harvester of a vertically-disposed supplemental engine, swiveled joints at top and bottom, and connections by which they are supported from the traction-engine, steam and exhaust pipes connecting the traction-engine with the supplemental engine having swivel-joints in line with the centers about which the supplemental engine is turnable, a universal coupling by which the supplemental-engine shaft is connected with a shaft extending rearwardly to drive the harvester mechanism, a band surrounding the supplemental-engine frame having a joint and yoke by which it is connected with the shaft which drives the harvester mechanism whereby power is transmitted therethrough to haul the harvester.

7. The combination with a traction-engine and a harvester of a supplemental vertically-disposed engine, swivel-joints by which the traction-engine is connected with the harvester and about which the supplemental engine is turnable to maintain its alinement with the harvester, a supplemental shaft connecting with the supplemental-engine shaft and having universal joints between, a mechanism whereby the power of said shaft is subdivided, consisting of a second shaft in alinement therewith having a coupling through which power is transmitted and a shaft journaled at right angles upon the threshing-machine with bevel-gear whereby the power of the primary shaft is transmitted equally through the direct and the transverse shafts to the threshing and cleaning mechanism.

8. A traction-engine connection whereby it is adapted to haul a harvester, in combination with supplemental removable wheels and wheel-frames journaled approximately in line with the main bearing-wheels of the engine, sprocket-wheels and connecting-chains whereby both main and supplemental bearing-wheels are driven directly from the engine, and a roller journaled upon framework extending in front of the steering-wheel substantially as described.

In witness whereof I have hereunto set my hand.

BENJAMIN HOLT.

Witnesses:
GEO. H. COWIE,
MAUDE L. FORREST.